United States Patent [19]

Kress

[11] Patent Number: 4,581,895
[45] Date of Patent: Apr. 15, 1986

[54] HYDROSTATIC TRANSAXLE ASSEMBLY

[75] Inventor: James H. Kress, Cedar Falls, Iowa

[73] Assignee: Deere & Company, Moline, Ill.

[21] Appl. No.: 621,985

[22] Filed: Jun. 18, 1984

[51] Int. Cl.⁴ ............................................. F16D 31/02
[52] U.S. Cl. ...................................... 60/485; 91/491;
192/85 AA
[58] Field of Search ....................... 192/0.098, 85 AA;
60/485; 91/491, 492

[56] References Cited

U.S. PATENT DOCUMENTS

| | | | |
|---|---|---|---|
| 3,419,096 | 12/1968 | Zagotta | 60/485 |
| 3,511,131 | 5/1970 | Kress | 81/176 |
| 3,602,347 | 8/1971 | Yamaguchi et al. | 192/85 AA |
| 3,760,691 | 9/1973 | Klechner et al. | 91/492 |
| 3,864,916 | 2/1975 | Maistrelli et al. | 60/485 |
| 3,948,049 | 4/1976 | Ohms et al. | 60/485 |

*Primary Examiner*—A. Michael Chambers

[57] ABSTRACT

A hydrostatic transaxle assembly having first and second output shafts extending outward therefrom. The assembly includes a housing enclosing a portion of the first and second output shafts and forming a generally cylindrical chamber therein. A manifold is positioned around one of the output shafts and has an outer surface which mates with an inner surface of the housing. A pair of high torque, low speed motors are secured to an inner surface of the housing on opposite sides of the manifold. One of the motors is splined to the first shaft while the other motor is splined to the second shaft. Operation of the motors cause the respective shafts to rotate. The motors operate on pressurized fluid which is supplied through fluid passages. A control valve is positioned across the fluid passages to regulate the operation thereof. The assembly further includes means for axially retaining and hydraulically balancing the motors against the sides of the manifold such that hydraulic forces acting on one of the motors will be transferred to and offset by a similar force acting on an opposite surface of the second motor.

10 Claims, 4 Drawing Figures

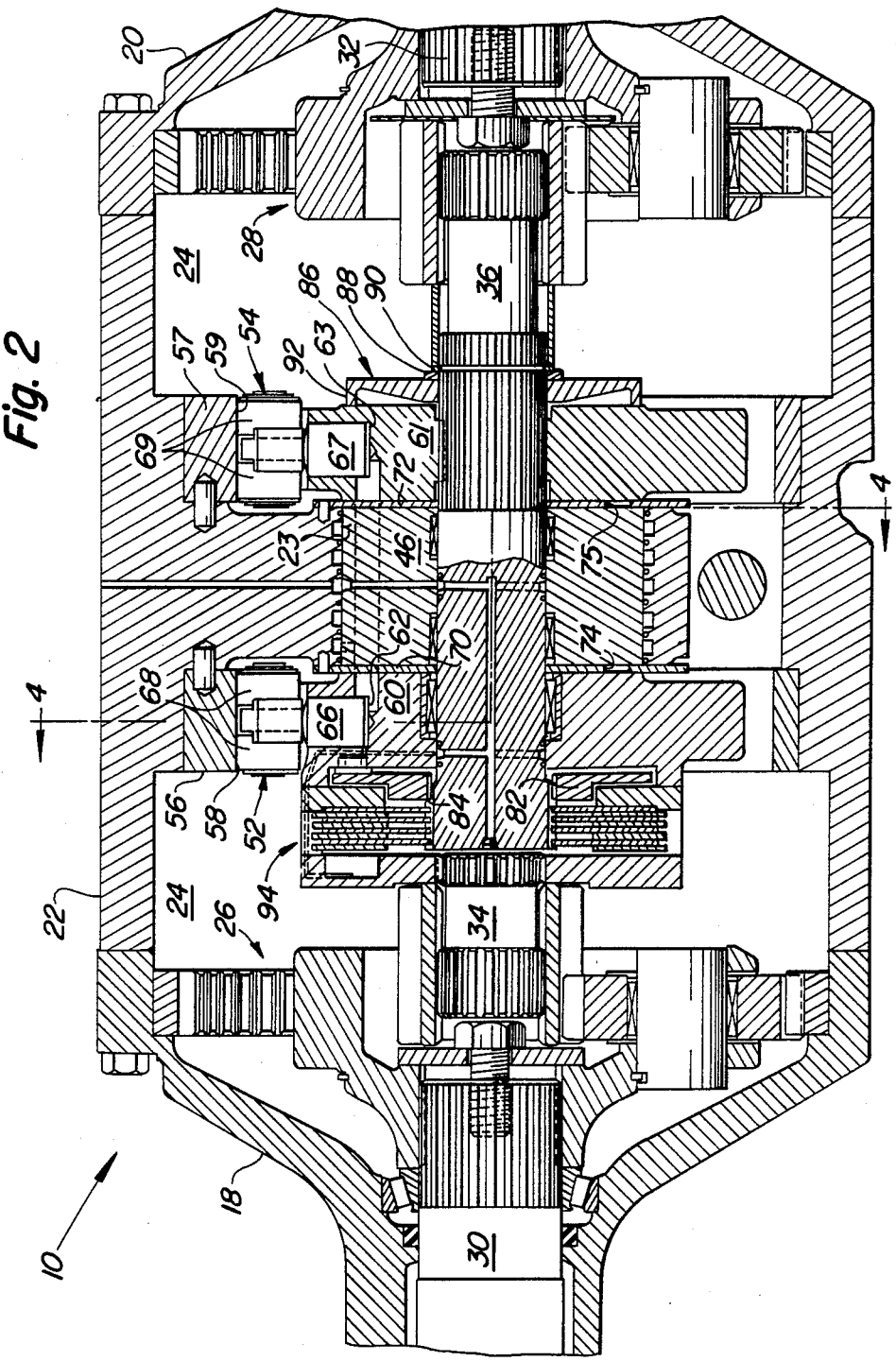

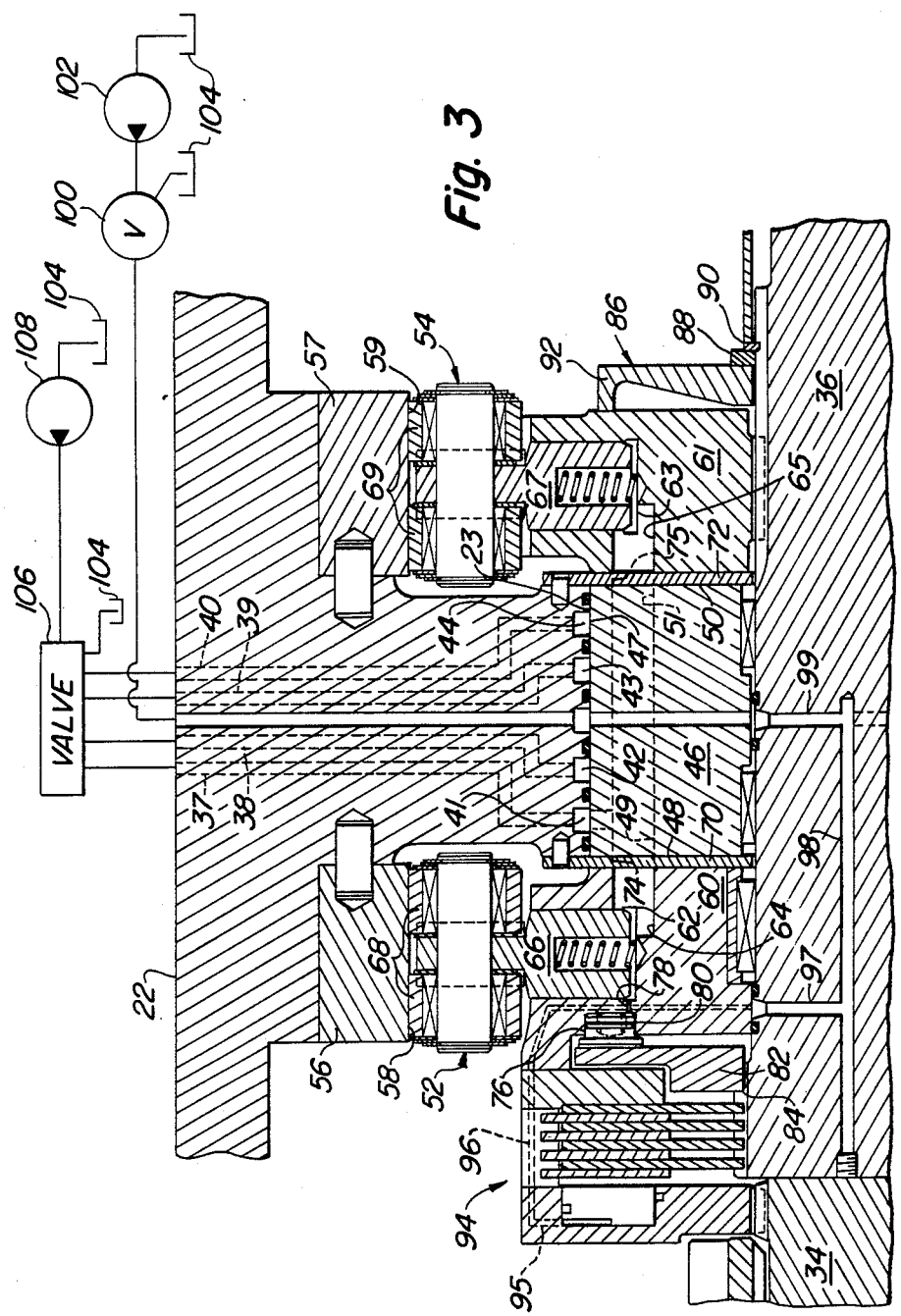

HYDROSTATIC TRANSAXLE ASSEMBLY

FIELD OF THE INVENTION

This invention relates to a hydrostatic transaxle assembly for a vehicle and more particularly to a pair of high torque, low speed hydraulic motors coupled together such that the hydraulic valve separating forces acting on one are conveyed to and balanced against the hydraulic forces acting on the other.

BACKGROUND OF THE INVENTION

High torque, low speed hydraulic motors, also referred to as cam-lobe motors, have been used in limited areas for low speed, high torque applications. Two U.S. Pat. Nos. 3,511,131 and 3,760,691 both issued to assignee, describe the workings of such motors and are incorporated herein by reference. Now a way has been found to more effectively couple a pair of these motors together for use in a transaxle assembly.

SUMMARY OF THE INVENTION

Briefly, this invention relates to a hydrostatic transaxle assembly for a vehicle which has first and second axially aligned output shafts extending outward therefrom. The assembly includes a housing which encloses a portion of the first and second output shafts and forms a generally cylindrical chamber. Located within the chamber and positioned on one of the output shafts is a manifold having an outer surface which mates with an inner surface of the housing. Positioned on opposite sides of the manifold are high torque, low speed motors which are secured to the inner surface of the housing. One of the motors is splined to the first output shaft and the other motor is splined to the second output shaft. Operation of the motors causes the respective shafts to rotate. A source of pressurized fluid is connected by reversible supply or return passages, through the housing and manifold, to the pair of motors. Control valves positioned across these passages regulate fluid flow into and out of the pair of motors. The assembly also contains a spring plate and a circular plate mounted on the second output shaft which axially aligns the two motors against the opposite radial faces of the manifold. The spring plate and circular plate cooperate to assure that the hydraulic valve separating forces acting on one motor will be transferred to the second motor.

The general object of this invention is to provide a hydrostatic transaxle assembly for a vehicle. A more specific object of this invention is to provide a hydrostatic transaxle assembly having a pair of high torque, low speed motors which are axially restrained and hydraulically balanced axially with respect to one another.

Another object of this invention is to provide a hydrostatic transaxle assembly which uses a commonality of parts and is easily adaptable to conventional final drives and brakes of a wide variety of off-road equipment.

Still further, an object of this invention is to provide a hydrostatic transaxle assembly which reduces frictional wear between rotating members.

Furthermore, an object of this invention is to provide a hydrostatic transaxle assembly which provides hydraulic balancing of axial forces generated at the manifold so that forces are self-contained within the motor so that frictional drag can be substantially reduced.

Other objects and advantages of the present invention will become more apparent to those skilled in the art in view of the following description and the accompanying drawings.

BRIEF DESCRIPTION OF THE DRAWINGS

FIG. 2 is an axial section through the hydrostatic transaxle assembly, as viewed generally along the line 2—2 of FIG. 4.

FIG. 3 is an enlarged sectional view of the upper sectional portion of FIG. 2, including fluid supply lines, pumps and valves.

DETAILED DESCRIPTION OF THE PREFERRED EMBODIMENT

Figure 1:
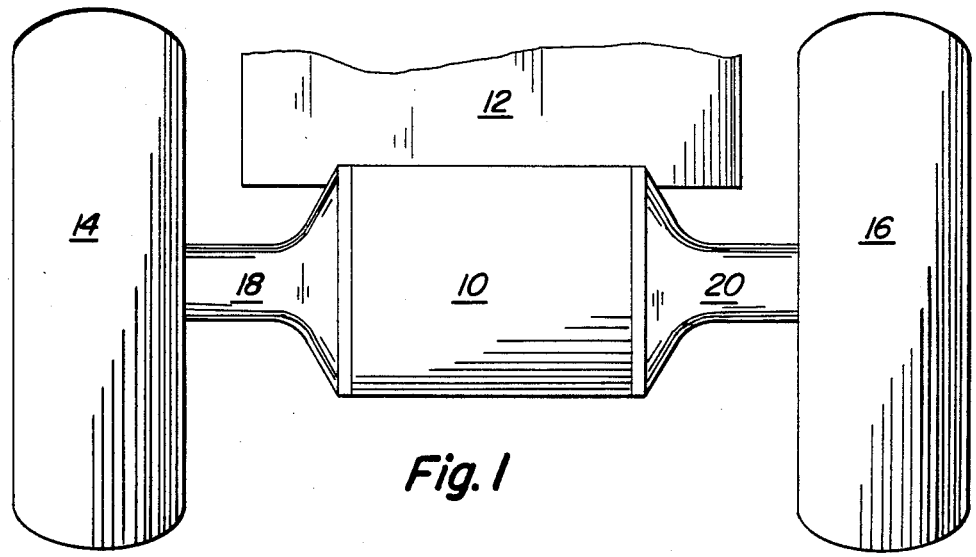
FIG. 1 is a rear view of a tractor utilizing a hydrostatic transaxle assembly.

Referring to FIG. 1, the hydrostatic transaxle assembly 10 is shown being utilized on a vehicle, such as a tractor 12. The tractor 12 has rear wheels 14 and 16 connected by axles positioned within left and right rear axle housings 18 and 20, respectively, to the hydrostatic transaxle assembly 10.

Referring to FIGS. 2 and 3, the hydrostatic transaxle assembly 10 includes a housing 22 forming a generally cylindrical chamber 24. The left and right axle housings 18 and 20 are secured to left and right ends of the chamber 24 and respectively enclose a pair of axially aligned planetary gear units 26 and 28. The planetary gear units 26 and 28 include outwardly extending output shafts 30 and 32, respectively. The two planetary gear units 26 and 28 are also joined together by first and second axially aligned shafts 34 and 36. It should be noted that the shafts 34 and 36 can also serve as the output shafts if no planetary reduction gearing is needed. The housing 22 has four fluid passages 37, 38, 39 and 40, see FIG. 3, formed therein which terminate at four annular chambers 41, 42, 43 and 44, respectively, formed on an inner surface 23 of the housing 22.

Figure 4:
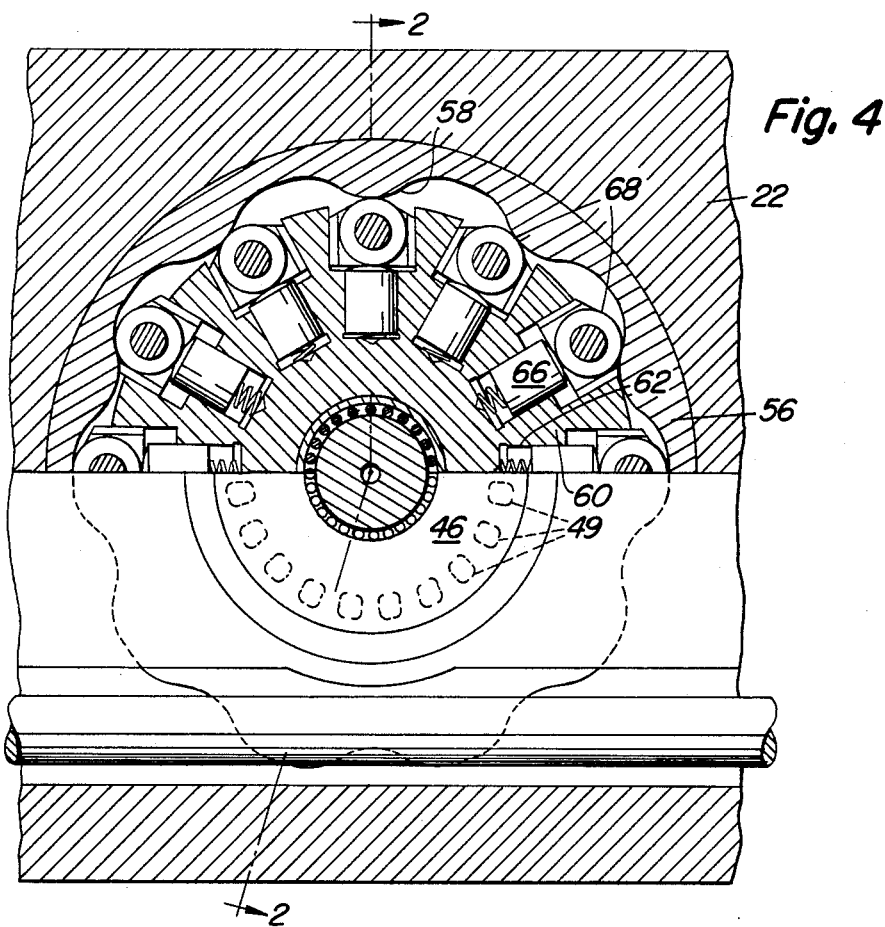
FIG. 4 is a section of the hydrostatic transaxle assembly as viewed generally along the line 4—4 of FIG. 2.

An annular manifold 46 encircles the second shaft 36 and has an outer circumferential surface 47 which mates with the inner surface 23 of the housing 22. The manifold 46 has a plurality of passages formed therein which extend from the four annular chambers 41–44 to its opposite left and right radial end faces 48 and 50, respectively. It should be noted that throughout this application, "left and right" will refer to the left and right sides of the figures as viewed by a reader. As shown in FIG. 4, the manifold 46 has twenty manifold ports (ten of which are shown on the lower half of the figure) equally spaced circumferentially about left and right radial end faces 48 and 50. The ports in the end face 48 are denoted as 49 and the ports in the end face 50 are denoted as 51.

Secured to the housing 22, on opposite sides of the manifold 46, are first and second high torque, low speed hydraulic motors 52 and 54. The motor 52 is splined to the shaft 34 while the motor 54 is splined to the shaft 36. The motors 52 and 54 contain an annular cam member 56 and 57, respectively, which is secured to the housing 22. The annular cam members 56 and 57 include cam surfaces defining a plurality of cam lobes 58 and 59, respectively, disposed at equal angular intervals, see FIG. 4. It should be noted that there are two manifold ports corresponding to each cam lobe 58 and 59. The motors 52 and 54 include piston housings 60 and 61, respectively, which respectively contain a plurality of radially extending cylinders 62 and 63. As shown in FIG. 4, there are twelve radial cylinders 62 formed in the piston housing 60 and twelve radial cylinders 63 formed in the piston housing 61. The radial cylinders 62 and 63 have associated valve ports 64 and 65, respectively, which sequentially communicate with the manifold ports 49 and 51 during rotation of the piston housings 60 and 61, respectively. A piston 66 is positioned in each of the cylinders 62 and a piston 67 is positioned in each of the cylinders 63. These pistons 66 and 67 reciprocate in response to alternate pressurizing and exhausting of the cylinders 62 and 63, respectively. Cam followers 68 and 69 engage with the cam surfaces of the adjacent cam members 56 and 57 to cause relative rotation between the piston housings 60 and 61 and the cylindrical housing 22 in response to reciprocation of the pistons 66 and 67. For a more detailed discussion of the operation of such cam lobe motors refer to the aforementioned U.S. Pat. Nos. 3,511,131 and 3,760,691.

Positioned between the radial end faces 48 and 50, of the manifold 46, and the adjacent motors 52 and 54 are a pair of valve plates 70 and 72, respectively. The valve plates 70 and 72 are secured to the housing 22, for example by pins, to ensure that they remain stationary relative to both the housing 22 and the manifold 46. The manifold 46 is also non-rotatably secured to the housing 22 by means not shown. The valve plates 70 and 72 contain a plurality of ports 74 and 75, respectively, which are equal in number, size and location to the ports 49 and 51 formed in the manifold 46. The valve plates 70 and 72 serve the useful purpose of taking up any wear which may occur between the rotating piston housings 60 and 61 and the manifold 46. Should the valve plates 70 and 72 become excessively worn, it is economical to replace them without having to replace the expensive manifold 46.

The motor 52 differs from the motor 54 in that each cylinder 62 is fluidly connected to an axially oriented balance piston 76 by a passage 78. The balance pistons 76 are axially movable within a recess 80 formed in the outer radial side surface of the motor 52. The outer surface of each of the balance pistons 76 exerts a force on an adjacent circular plate 82. The circular plate 82 is splined to the second shaft 36 and is restrained from moving axially away from the motor 52 by an enlarged shoulder 84 formed on the second shaft 36. As the balance pistons 76 are urged outward by fluid pressure they come in contact with the circular plate 82. The passage 78, the ports 49, 50, 74 and 75, and the passages therebetween further cooperate to ensure that the fluid pressure in the radial cylinders 62 and 63 is equalized.

The hydrostatic transaxle assembly 10 further includes a spring plate 86 which is mounted to the second shaft 36 by a washer 88 and a snap ring 90. The spring plate 86 has a circular tongue 92 formed on its outer circumference which bears against the radial side surface of the motor 54 thereby forcing it leftwards against the manifold 46. It should be noted that the configuration of the spring plate causes it to act like a spring to provide a minimum force to keep the valve plates 70 and 72 in intimate contact with both the manifold 46 and with the piston housings 60 and 61 at all times.

The hydrostatic transaxle assembly 10 includes a clutch 94 which functions as a differential lock and which is positioned between the first shaft 34 and the second shaft 36. The clutch 94 is shown as a sandwiched section which is part of the piston housing 60 and serves as the structure by which the motor 52 is splined to the first shaft 34. The clutch 94 is hydraulically connected by passages 95, 96, 97, 98 and 99 to a valve 100. The valve 100 receives pressurized fluid from a pump 102 which is connected to a reservoir 104. When the valve 100 is in a first position, the pressurized fluid is routed to the clutch 94 to cause engagement thereof, as illustrated, such that the first and second shafts 34 and 36 rotate in unison. When the valve 100 is in a second position, the fluid in the passages 95-99 are connected to a reservoir 104 such that the clutch 94 can be disengaged permitting the first and second shafts 34 and 36, to rotate independently, that is, with differential action. The independent rotation of the shafts 34 and 36 permit the vehicle to turn.

The four passages 37, 38, 39 and 40 formed in the housing 22 are connected to a control valve 106 which in turn is connected to a fluid pump 108. Pressurized fluid from the pump 108 or return fluid to the reservoir 104 is distributed between the various four lines by the control valve 106 as is explained in U.S. Pat. No. 3,511,131.

In straight forward operation of the tractor 12 with both motors 52 and 54 rotating at equal speed, there is no relative motion between the balance pistons 76 and the circular plate 82. If two conventional hydraulic motors, as taught in U.S. Pat. No. 3,511,131, were connected to form a transaxle assembly, relative motion would occur in the large axial bearing members during both straight steering and during turning modes. This would cause power losses due to friction and thus would be less efficient than the present invention.

During turning of the tractor 12 with the present invention, a degree of relative motion may occur at the interface of the balance pistons 76 and the circular plate 82. The degree of relative motion depends upon the severity of the turn. Power losses will then develop at this interface depending on the magnitude of friction and the degree of relative rotation.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A hydrostatic transaxle assembly having first and second output shafts extending outward therefrom, said assembly comprising:
   (a) a housing enclosing a portion of said first and second output shafts and forming a generally cylindrical chamber thereabout;
   (b) a manifold positioned on one of said output shafts and having an outer surface which mates with an inner surface of said housing;
   (c) a pair of high torque, low speed motors secured to an inner surface of said housing on opposite sides of said manifold, one of said motors being splined to said first output shaft and said other motor being splined to said second output shaft, with operation of said motors causing said respective shafts to rotate;
   (d) fluid passages connecting a source of pressurized fluid to said pair of motors;
   (e) control valve means for regulating fluid flow into and out of said pair of motors to control the operation thereof; and (f) means for axially retaining and hydraulically balancing said motors against the sides of said manifold, said means being mounted on said second output shaft and contacting a radial face of each of said motors.

2. The hydrostatic transaxle assembly of claim 1 wherein said means for axially retaining and hydraulically balancing said motors includes a spring plate mounted on said second output shaft which contacts a radial face of said second motor, a plurality of axially oriented balance pistons which extend outward from each cylinder of said first motor, and a circular plate mounted on said second output shaft which bears against a radial face of each of said balance pistons, said spring plate and said circular plate being restrained from moving axially outward relative to one another thereby enabling hydraulic forces acting on one motor to be transferred to said other motor, said action providing for a close fit between said motors and opposite radial surfaces of said manifold.

3. The hydrostatic transaxle assembly of claim 1 wherein a clutch is positioned between said first and second output shafts, engagement of said clutch causing said first output shaft to rotate in unison with said second output shaft and disengagement of said clutch permitting said first and second output shafts to rotate independently.

4. A hydrostatic transaxle assembly for a vehicle having first and second axially aligned output shafts, said assembly comprising:
   (a) a housing enclosing a portion of said first and second output shafts and forming a generally cylindrical chamber thereabout;
   (b) a manifold positioned on said second output shaft and having an outer surface which mates with an inner surface of said housing;
   (c) a pair of high torque, low speed hydraulic motors secured to an inner surface of said housing on opposite sides of said manifold, one of said motors being splined to said first output shaft and said other motor being splined to said second output shaft, operation of said motors causing said respective shafts to rotate;
   (d) fluid passages extending through said housing and manifold to said pair of motors;
   (e) control valve means connected across said fluid passages for alternately connecting a source of pressurized fluid and a reservoir thereto to thereby regulate fluid flow into and out of said pair of motors to control the operation thereof;
   (f) means for axially retaining and hydraulically balancing said motors against the sides of said manifold, said means being mounted on said second output shaft and contacting a radial face of each of said motors; and
   (g) a hydraulically actuatable clutch positioned between said first and second output shafts, engagement of said clutch causing said first output shaft to rotate in unison with said second output shaft and disengagement of said clutch permitting said first and second output shafts to rotate independently.

5. The hydrostatic transaxle assembly of claim 4 wherein said means for axially retaining and hydraulically balancing said motors includes a spring plate mounted on said second output shaft which contacts a radial face of said second motor, a plurality of axially oriented balance pistons which extend outward from each cylinder of said first motor, and a circular plate mounted on said second output shaft which bears against a radial face of each of said balance pistons, said spring and circular plates being restrained from moving axially outward relative to one another thereby enabling hydraulic forces acting on one motor to be transferred to said other motor, said action providing for a close fit between said motors and opposite radial surfaces of said manifold.

6. The hydrostatic transaxle assembly of claim 5 wherein said spring plate is retained from moving axially away from said adjacent motor by a snap ring.

7. The hydrostatic transaxle assembly of claim 5 wherein said circular plate is splined to said second output shaft and is retained from moving axially away from said adjacent motor by an enlarged shoulder formed on said second output shaft.

8. A hydrostatic transaxle assembly for a vehicle comprising:
   (a) a housing forming a generally cylindrical chamber and having at least four passages formed therein which terminate at four annular chambers formed on an inner surface of said housing, said housing enclosing a pair of oppositely aligned planetary gear units each having an outwardly extending output shaft, said planetary gear units being joined together by first and second axially aligned shafts;
   (b) a manifold encircling said second shaft and having an outer circumferential surface which mates with said inner surface of said housing, said manifold having a plurality of passages formed therein which provide fluid communication between said four annular chambers and a plurality of manifold ports formed on opposite radial end faces thereof;
   (c) first and second hydraulic motors splined to said first and second shafts, respectively, on opposite sides of said manifold, each motor having an annular cam member secured to an inner surface of said housing which includes a cam surface defining a plurality of cam lobes disposed at equiangular intervals around said cam member, a piston housing having a plurality of radially extending cylinders, each of said cylinders having an associated valve port sequentially communicating with said manifold ports during rotation of said piston housing, and a reciprocating piston positioned in each of said cylinders which responds to alternate pressurizing and exhausting of said cylinders, said pistons having cam followers attached to an outer end thereof which are engageable with said adjacent cam surface to cause relative rotation between said motors and said housing in response to reciprocation of said pistons;
   (d) fluid passages connected to said four passages formed in said housing;
   (e) control valve means connected across said fluid passages for alternately connecting a source of pressurized fluid and a reservoir thereto to thereby regulate fluid flow into and out of said pair of motors to control the operation thereof; and
   (f) means for axially retaining and hydraulically balancing said motors against said radial end faces of said manifold, said means including a spring plate mounted on said second output shaft which contacts a radial face of said second motor, a plurality of axially oriented balanced pistons which extend outward from each cylinder of said first motor, and a circular plate mounted on said second output shaft which bears against a radial face of each of said balance pistons, said spring plate and said circular plate being restrained from moving axially outward relative to one another thereby enabling hydraulic forces acting on one motor to be transferred to said other motor, said action providing for a close fit between said motors and opposite radial surfaces of said manifold.

9. The hydrostatic transaxle assembly of claim 8 wherein a clutch is positioned between said first and second shafts, engagement of said clutch causing said first shaft to rotate in unison with said second shaft and disengagement of said clutch permitting said first and second shafts to rotate independently.

10. The hydrostatic transaxle assembly of claim 8 wherein valve plates are positioned adjacent to each radial end face of said manifold and are secured to said housing.

* * * * *